(12) United States Patent
Rintelmann et al.

(10) Patent No.: US 10,160,074 B2
(45) Date of Patent: Dec. 25, 2018

(54) METHOD OF JOINING A FUNCTIONAL ELEMENT, HAVING AN ATTACHMENT PART, WITH A METAL SHEET

(71) Applicant: AUDI AG, Ingolstadt (DE)

(72) Inventors: Jochen Rintelmann, Dessau (DE); Matthias Egner, Möckmühl (DE)

(73) Assignee: AUDI AG, Ingolstadt (DE)

( * ) Notice: Subject to any disclaimer, the term of this patent is extended or adjusted under 35 U.S.C. 154(b) by 97 days.

(21) Appl. No.: 14/748,641

(22) Filed: Jun. 24, 2015

(65) Prior Publication Data

US 2015/0375350 A1 Dec. 31, 2015

(30) Foreign Application Priority Data

Jun. 25, 2014 (DE) .......................... 10 2014 009 447

(51) Int. Cl.
| | |
|---|---|
| *B23P 19/10* | (2006.01) |
| *B21D 22/02* | (2006.01) |
| *B21D 22/20* | (2006.01) |
| *B23P 19/06* | (2006.01) |
| *B21C 51/00* | (2006.01) |
| *B21J 15/28* | (2006.01) |
| *B21D 39/00* | (2006.01) |

(52) U.S. Cl.
CPC ............ *B23P 19/10* (2013.01); *B21C 51/005* (2013.01); *B21D 22/02* (2013.01); *B21D 22/20* (2013.01); *B21J 15/28* (2013.01); *B23P 19/062* (2013.01); *B21D 39/00* (2013.01)

(58) Field of Classification Search
CPC ...... B23P 19/10; B23P 19/062; B21C 51/005; B21J 15/28; B21D 22/02; B21D 22/20; B21D 39/00
See application file for complete search history.

(56) References Cited

U.S. PATENT DOCUMENTS

| | | | |
|---|---|---|---|
| 1,695,476 A | 12/1928 | Winkler | |
| 4,445,264 A | 5/1984 | Banerian | |
| 6,668,501 B2 * | 12/2003 | Adebar | ................ E04F 13/045 411/155 |

(Continued)

FOREIGN PATENT DOCUMENTS

| | | |
|---|---|---|
| CN | 101283187 | 10/2008 |
| CN | 102371423 | 3/2012 |

(Continued)

OTHER PUBLICATIONS

Chinese Search Report dated Feb. 4, 2017 with respect to counterpart Chinese patent application 2015103540557.

(Continued)

*Primary Examiner* — John C Hong
(74) *Attorney, Agent, or Firm* — Henry M. Feiereisen LLC

(57) ABSTRACT

In a method for joining a functional element with a metal sheet, with the functional element having an attachment part for attachment of a structure to the metal sheet, a cold forming process employed for the metal sheet is also used to mark the metal sheet with a sink mark by which a joining position of the metal sheet with the functional element is indicated. After the functional element is joined with the metal sheet at the joining position, the joining position is checked with respect to a position of the functional element inside of the sink mark.

12 Claims, 1 Drawing Sheet

(56) References Cited

U.S. PATENT DOCUMENTS

| | | |
|---|---|---|
| 6,862,790 B2 | 3/2005 | Kato |
| 2010/0135718 A1* | 6/2010 | Babej .................... B23P 19/062 403/279 |
| 2014/0115895 A1* | 5/2014 | Herzinger .............. B21D 22/20 29/897.2 |

FOREIGN PATENT DOCUMENTS

| | | | |
|---|---|---|---|
| CN | 103561896 | | 2/2014 |
| DE | 100 12 081 | | 11/2001 |
| DE | 10 2004 030 223 | | 1/2006 |
| DE | 10 2010 007 575 | | 8/2011 |
| DE | 102010007575 | * | 8/2011 |
| DE | 10 2010 041 356 | | 3/2012 |
| EP | 1 609 561 | | 12/2005 |
| WO | WO 2009/140977 | | 11/2009 |

OTHER PUBLICATIONS

Translation of Chinese Search Report dated Feb. 4, 2017 with respect to counterpart Chinese patent application 2015103540557.

* cited by examiner

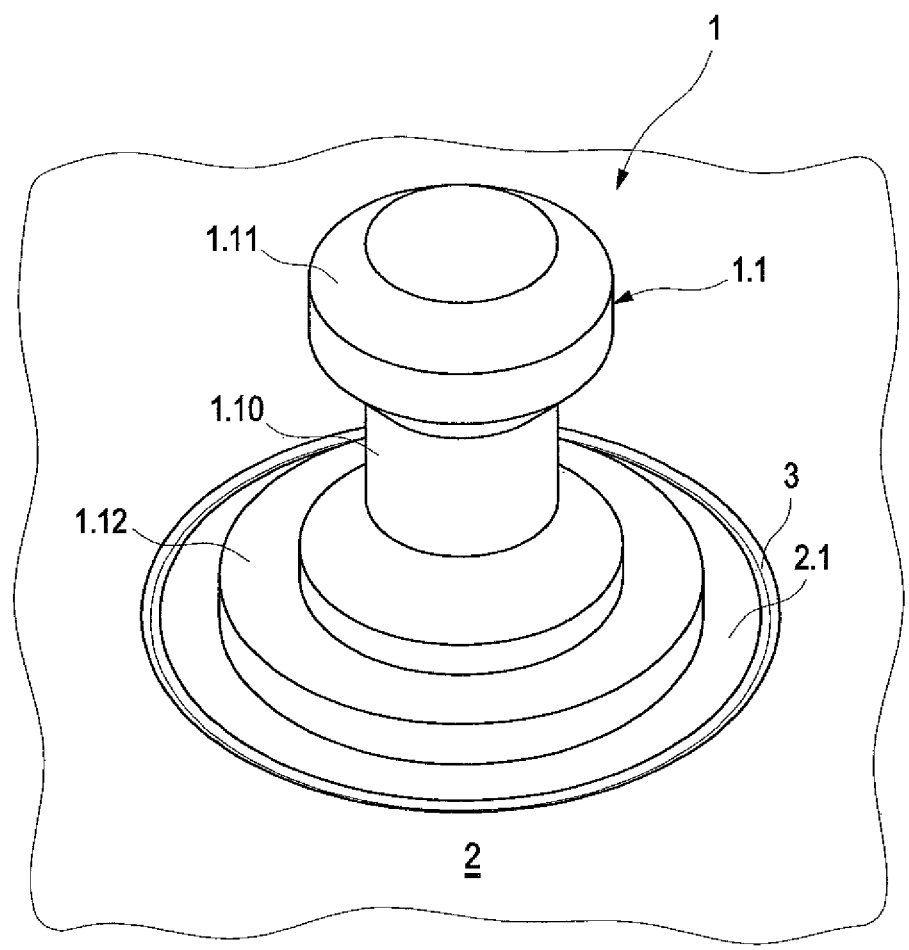

METHOD OF JOINING A FUNCTIONAL ELEMENT, HAVING AN ATTACHMENT PART, WITH A METAL SHEET

CROSS-REFERENCES TO RELATED APPLICATIONS

This application claims the priority of German Patent Application, Serial No. 10 2014 009 447.2, filed Jun. 25, 2014, pursuant to 35 U.S.C. 119(a)-(d), the disclosure of which is incorporated herein by reference in its entirety as if fully set forth herein.

BACKGROUND OF THE INVENTION

The present invention relates to a method of joining a functional element, having an attachment part, with a metal sheet.

The following discussion of related art is provided to assist the reader in understanding the advantages of the invention, and is not to be construed as an admission that this related art is prior art to this invention.

The manufacture of vehicle bodies and body assemblies involves the use of functional elements for attachment of further components or assemblies. These functional elements are to be joined with metal sheets and may involve rivets, punches, press-in elements, welding elements, friction welding elements or adhesive elements, drilling screws or flow punch screws, etc. Such functional elements have as attachment part for further components either a bolt with external thread or a nut with internal thread. The use of clinch elements or clinch river elements in the form of threaded bolt or nut and joined with a metal sheet by a penetration process (clinching, clinch riveting) is also known in the art.

When such a functional element is positioned at a metal sheet, the position of the functional element has to be checked. This check normally occurs after undergoing the joining process and involves a measurement of the position of the joined functional element with consideration of its positional tolerance. This is time-consuming and increases production costs when joining a metal sheet of a vehicle body with functional elements.

It would therefore be desirable and advantageous to provide an improved method of joining a functional element, having an attachment part, with a metal sheet so as to obviate prior art shortcomings and to enable a quick and simple check as to the correct position of functional elements.

SUMMARY OF THE INVENTION

According to one aspect of the present invention, a method includes cold forming a metal sheet and thereby marking the metal sheet with a sink mark to indicate a joining position with a functional element, joining the functional element with the metal sheet at the joining position, and checking the joining position with respect to a position of the functional element inside of the sink mark.

The present invention resolves prior art problems by surprisingly recognizing that the cold forming process for the metal sheet may also be used in a simple manner to form a sink mark for each functional element so as to mark the intended joining position for the functional element. Thus, after placement of the functional element, its joining position can be checked, e.g. optically checked. When the functional element is set inside of the sink mark, the position of the functional element is correct, otherwise it is not. Thus, the correct position of the functional element can be quickly ascertained, without the need for carrying out a cumbersome measurement. As a result, the time period for operating a facility for setting several such functional elements is significantly reduced.

According to another advantageous feature of the present invention, the sink mark can have a closed and linear configuration to encircle the joining position of the metal sheet for the functional element.

According to another advantageous feature of the present invention, the sink mark can be formed in the metal sheet as annular groove. The groove may hereby have a semicircular or triangular cross section.

According to another advantageous feature of the present invention, the sink mark can have a segmented or spot-like configuration to encircle the joining position of the metal sheet for the functional element.

According to another advantageous feature of the present invention, the sink mark can be formed into the metal sheet by considering a positional tolerance of the joining position. As a result, the position of the functional element can be checked visually.

According to another advantageous feature of the present invention, the joining position can be checked by an optical test device. In this way, the correct position of the functional element in the metal sheet can be checked by an automated process.

According to another advantageous feature of the present invention, the metal sheet can be cold formed by a deep drawing process, pressing process or embossing process.

There are many options to configure the functional element. For example, the functional element may be constructed in the form of a press-in bolt or press-in nut. The press-in bolt may hereby have a threaded bolt as attachment part, and the press-in nut an internal thread. It is also possible to construct the functional element as a pierce bolt or pierce nut, as a rivet bolt or rivet nut, as a clinch bolt, clinch rivet bolt, clinch nut, or clinch rivet nut, as a welding element or friction welding element, as adhesive element, or as a drilling screw or flow punch screw, etc.

BRIEF DESCRIPTION OF THE DRAWING

Other features and advantages of the present invention will be more readily apparent upon reading the following description of currently preferred exemplified embodiments of the invention with reference to the accompanying drawing, in which the sole FIG. 1 shows a schematic perspective illustration of an arrangement of a functional element joined to a metal sheet.

DETAILED DESCRIPTION OF PREFERRED EMBODIMENTS

The depicted embodiment is to be understood as illustrative of the invention and not as limiting in any way. It should also be understood that the FIGURE is not necessarily to scale. Details which are not necessary for an understanding of the present invention or which render other details difficult to perceive may have been omitted.

Turning now to FIG. 1, there is shown a schematic perspective illustration of an arrangement of a functional element 1 joined to a metal sheet 2. FIG. 1 depicts hereby only a portion of the metal sheet 2. In the area of this portion, the functional element 1, configured here by way of example in the form of a clinch rivet bolt, is set inside of a joining position 2.1 which is encircled by a linear sink mark 3.

The metal sheet 2 undergoes a cold forming process which is also used to form the sink mark 3 in the metal sheet 2, whereby the positional tolerance of the functional element 1 is taken into account. It is to be understood by persons skilled in the art that the term "sink mark" is used here in a generic sense and may involve a boss or depression. In the non-limiting example shown in FIG. 1, the sink mark 3 is formed as annular groove or embossed ring with a semicircular cross section. The joining position 2.1 for the subsequent placement or setting of the functional element 1 is hereby the region inside of the sink mark 3.

In the subsequent process step, the functional element 1 is placed and formed into the metal sheet. As a result of the formed sink mark 3, it becomes possible to visually ascertain whether the position of the functional element 1 is correct, i.e. whether the functional element 1 is positioned inside of the predefined joining position 2.1. According to FIG. 1, the functional element 1 is situated inside of the annular groove 3, i.e. the position of the functional element 1 is correct.

The control of the position of the functional element 1 within the metal sheet 2 may be implemented also automatically by using an appropriate optical device.

The sink mark 3 shown in FIG. 1 may also be realized by an annular groove with triangular cross section, instead of an annular groove with semicircular cross section.

The sink mark 3 may also have a segmented or spot-like configuration, for example in the form of groove segments or embossed spots which frame the joining position in a circular manner.

It is, of course, also within the scope of the present invention to provide the sink mark 3 of other geometric shapes, e.g. rectangular contour, instead of a circular configuration.

The functional element 1 includes an attachment part 1.1 for attachment of a further structure. The attachment part 1.1 is configured as locking connection and includes a cylindrical portion 1.10 which terminates on one end in a flange 1.11 and transitions on an opposite end in a contact flange 1.12 which abuts the metal sheet 2.

The attachment part 1.1 of the functional element 1 may also be configured as a threaded bolt, or as nut with an internal thread.

Joining of the functional element 1 with the metal sheet may be realized by various joining techniques. Besides the configuration of the functional element 1 as clinch rivet bolt or clinch river nut, it is also possible to construct the functional element as press-in bolt with a threaded bolt as attachment part, or as press-in nut. It is also conceivable to construct the functional part as pierce bolt or pierce nut, as a rivet bolt or rivet nut, as a clinch bolt or clinch nut, as a welding element or friction welding element, as adhesive element, or as a drilling screw or flow punch screw, etc. The respective joining process to suit the various configurations of the functional element are known in the art so that further description thereof is omitted for the sake of simplicity.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A method for joining a functional element to a metal sheet, comprising:
    cold forming a metal sheet and thereby marking the metal sheet with a sink mark to demarcate a recessed joining position of a size exceeding a maximum dimension of an attachment part of the functional element;
    placing the functional element in a region of the joining position inside the sink mark so as to position a metal-sheet-contacting contact flange of the attachment part within a boundary of the sink mark; and
    checking the joining position with respect to a position of the functional element inside of the sink mark, wherein the joining position is checked by an optical test device.

2. The method of claim 1, wherein the sink mark has a closed and linear configuration to encircle the joining position of the metal sheet for the functional element.

3. The method of claim 1, wherein the sink mark has a segmented or spot-like configuration to encircle the joining position of the metal sheet for the functional element.

4. The method of claim 1, wherein the sink mark is formed in the metal sheet with consideration of a positional tolerance of the joining position.

5. The method of claim 1, wherein the metal sheet is cold formed by a deep drawing process, pressing process or embossing process.

6. The method of claim 1, wherein the functional element is constructed in the form of a press-in bolt or press-in nut.

7. The method of claim 1, wherein the functional element is constructed in the form of a pierce bolt or pierce nut.

8. The method of claim 1, wherein the functional element is constructed in the form of a rivet bolt or rivet nut.

9. The method of claim 1, wherein the functional element is constructed in the form of a clinch bolt, clinch rivet bolt, clinch nut, or clinch rivet nut.

10. The method of claim 1, wherein the functional element is constructed in the form of a welding element or friction welding element.

11. The method of claim 1, wherein the functional element is constructed in the form of an adhesive element.

12. The method of claim 1, wherein the functional element is constructed in the form of a drilling screw or flow punch screw.

* * * * *